(12) United States Patent
Hou

(10) Patent No.: US 7,980,127 B1
(45) Date of Patent: Jul. 19, 2011

(54) FLOW METER

(76) Inventor: Yao-Sung Hou, Kaohsiung (TW)

( * ) Notice: Subject to any disclaimer, the term of this patent is extended or adjusted under 35 U.S.C. 154(b) by 0 days.

(21) Appl. No.: 12/945,287

(22) Filed: Nov. 12, 2010

(51) Int. Cl.
  *G01F 15/14* (2006.01)
(52) U.S. Cl. .......................................................... 73/273
(58) Field of Classification Search .................... 73/273, 73/202.5, 240.21
  See application file for complete search history.

(56) References Cited

U.S. PATENT DOCUMENTS

| | | | | |
|---|---|---|---|---|
| 3,720,106 | A * | 3/1973 | Varga | 73/273 |
| 5,209,113 | A * | 5/1993 | Sawada et al. | 73/202.5 |
| 7,313,954 | B2 * | 1/2008 | Kouno et al. | 73/202.5 |

* cited by examiner

*Primary Examiner* — Jewel Thompson

(74) *Attorney, Agent, or Firm* — Muncy, Geissler, Olds & Lowe, PLLC

(57) ABSTRACT

A flow meter includes a transparent holder with an inlet and an outlet connected to a first, second and third fastening portions through a first, second, third and fourth connection ribs, a first and second fastening assemblies screwed respectively with the inlet and outlet, a butting member located at one end of the transparent holder, a flow scale plate located on a recess of the transparent holder, and a regulation member coupled to the inlet. The three fastening portions with respectively a first, second and third fastening hole are integrally formed with the inlet and outlet. Through the first and second fastening holes, the transparent holder is firmly fastened to a machine. Thus hydraulic pressure generated in the inlet and outlet does not cause loosening due to screw fastening of the three fastening portions. The structural strength of the transparent holder is increased and assembly is easier.

6 Claims, 8 Drawing Sheets

FLOW METER

FIELD OF THE INVENTION

The present invention relates to a flow meter and particularly to an improved flow meter that has stronger structure strength and can be easily assembled.

BACKGROUND OF THE INVENTION

A conventional flow meter 1, referring to FIGS. 1, 2 and 3, includes a transparent holder 10 containing a housing chamber 101 with an inlet 102 and an outlet 103 located therein communicating with each other through a flow passage 104. The flow passage 104 holds an indication ball 107. The transparent holder 10 has a recess 108 on an upper side to hold a flow scale plate 15. Incorporating the indication ball 107 with the flow scale plate 15, users can instantly see fluid flowing conditions via the transparent holder 10 from outside. The conventional flow meter 1 also has a first fastening assembly 11 with a first fastening member 111 wedged in the inlet 102 and run through thereof, a second fastening assembly 12 with a second fastening member 121 wedged in the outlet 103, an anchor plate 13 which is located on a lower side of the transparent holder 10 having a first opening 131 and a second opening 132 at two ends corresponding to the inlet 102 and outlet 103 respectively, a butting member 14 with a retaining bar 144 extended from one end into the flow passage 104 to stop the indication ball 107 from flowing out and further is retained by a latch member 146 to prevent leakage, and a regulation member 16 screwed to the first fastening member 111 to regulate fluid flowing amount within a high and low range.

The flow meter 1 constructed out of the aforesaid elements has the first and second fastening members 111 and 121 wedged respectively in the inlet 102 and outlet 103 with distal ends thereof coupled to the first and second openings 131 and 132 of the anchor plate 13 to be fastened to the transparent holder 10. The anchor plate 13 also has a plurality of fastening holes for the flow meter 1 to be fastened on a machine. As the anchor plate 13 and the transparent holder 10 are coupled through screwing rather than integrally forming, the fluid (shown by broken lines in FIG. 3) injected through the inlet 102 generates hydraulic pressure exerting on the anchor plate 13 for a long time, such that the anchor plate 13 easily tends to loosening with respect to the transparent holder 10, and then damage could take place. Thus the structure of the conventional flow meter 1 is difficult to be reinforced, and the assembly of which is also troublesome.

SUMMARY OF THE INVENTION

The primary object of the present invention is to overcome the shortcomings of the conventional flow meter that tends to loosening when used for a long period of time and is deficient in structural strength and difficult to be assembled by providing an improved flow meter with a reinforced structure and enhanced stability.

To achieve the foregoing object, the flow meter according to the invention at least includes a transparent holder with an inlet and an outlet and a first fastening portion, a second fastening portion and a third fastening portion that are bridged by a first connection rib, a second connection rib, a third connection rib and a fourth connection rib located on a lower end of the transparent holder, a first fastening assembly and a second fastening assembly screwed respectively with the inlet and outlet to form coupling, a butting member located at one side of the transparent holder, a flow scale plate located on a recess on an upper side of the transparent holder, and a regulation member coupled on the upper side of the inlet.

By means of the structure set forth above, the flow meter of the invention can achieve the following effects:

During assembly of the flow meter, the inlet and the outlet are coupled with the first, second and third fastening portions by the first, second, third and fourth connection ribs to form the transparent holder in an integrated fashion, and the transparent holder can be firmly fastened to a selected machine through a first fastening hole and a second fastening hole formed respectively on the first and second fastening portions. When hydraulic pressure is generated in the inlet and outlet of the transparent holder, loosening is less likely to take place due to stronger fastening strength resulting from the first and second fastening portions. Thus the structural strength of the transparent holder increases and the assembly of which also is easier.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
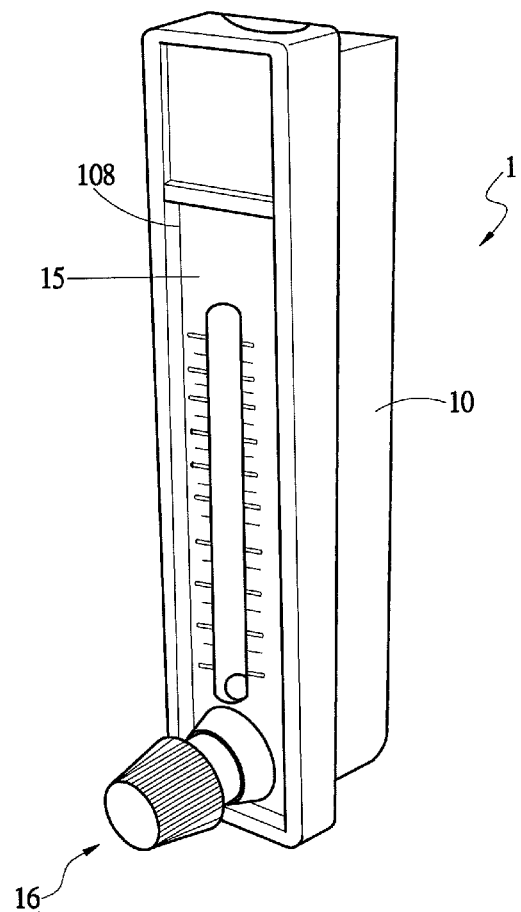
FIG. 1 is a perspective view of a conventional flow meter.
Figure 2:
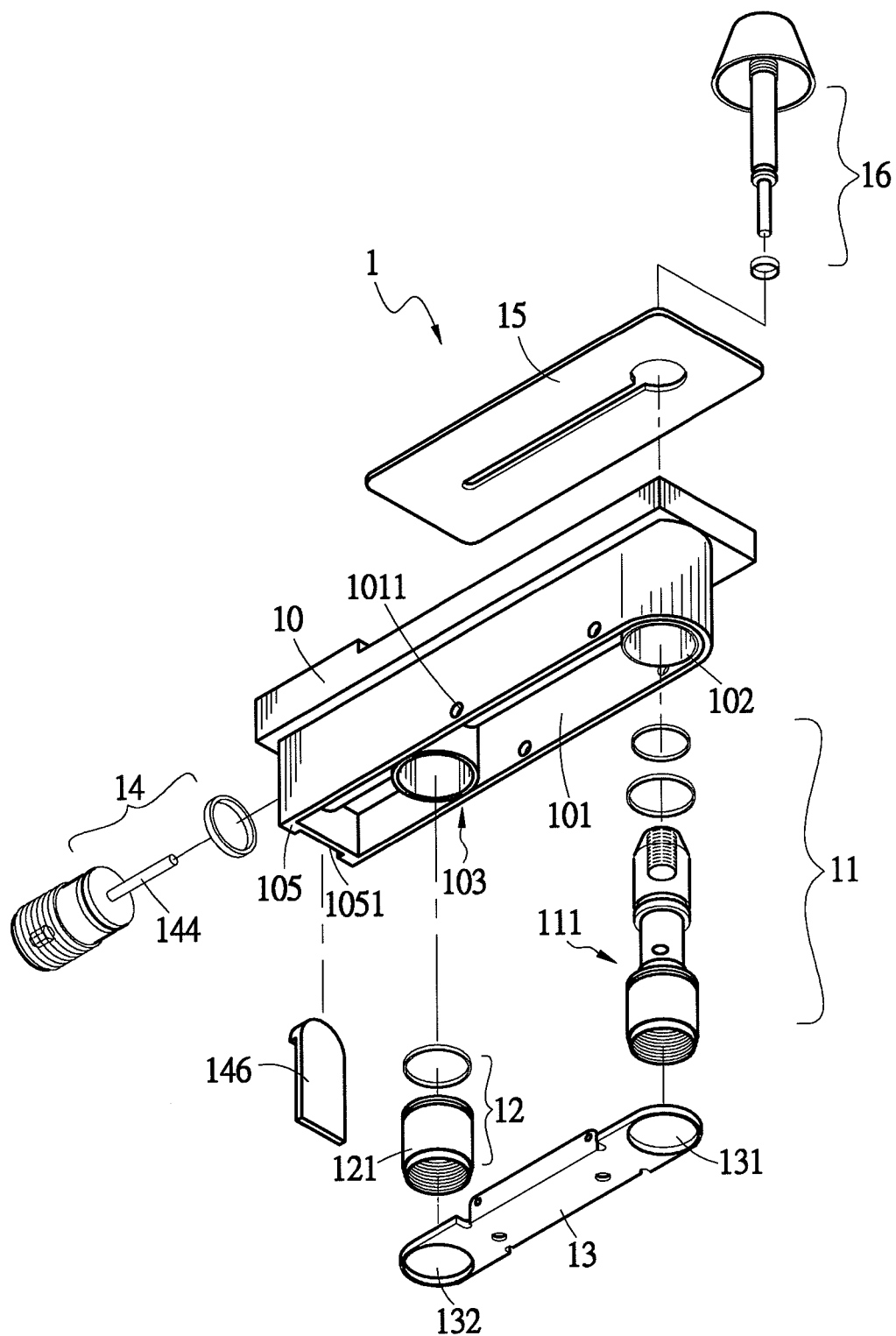
FIG. 2 is a bottom exploded view according to FIG. 1.
Figure 3:
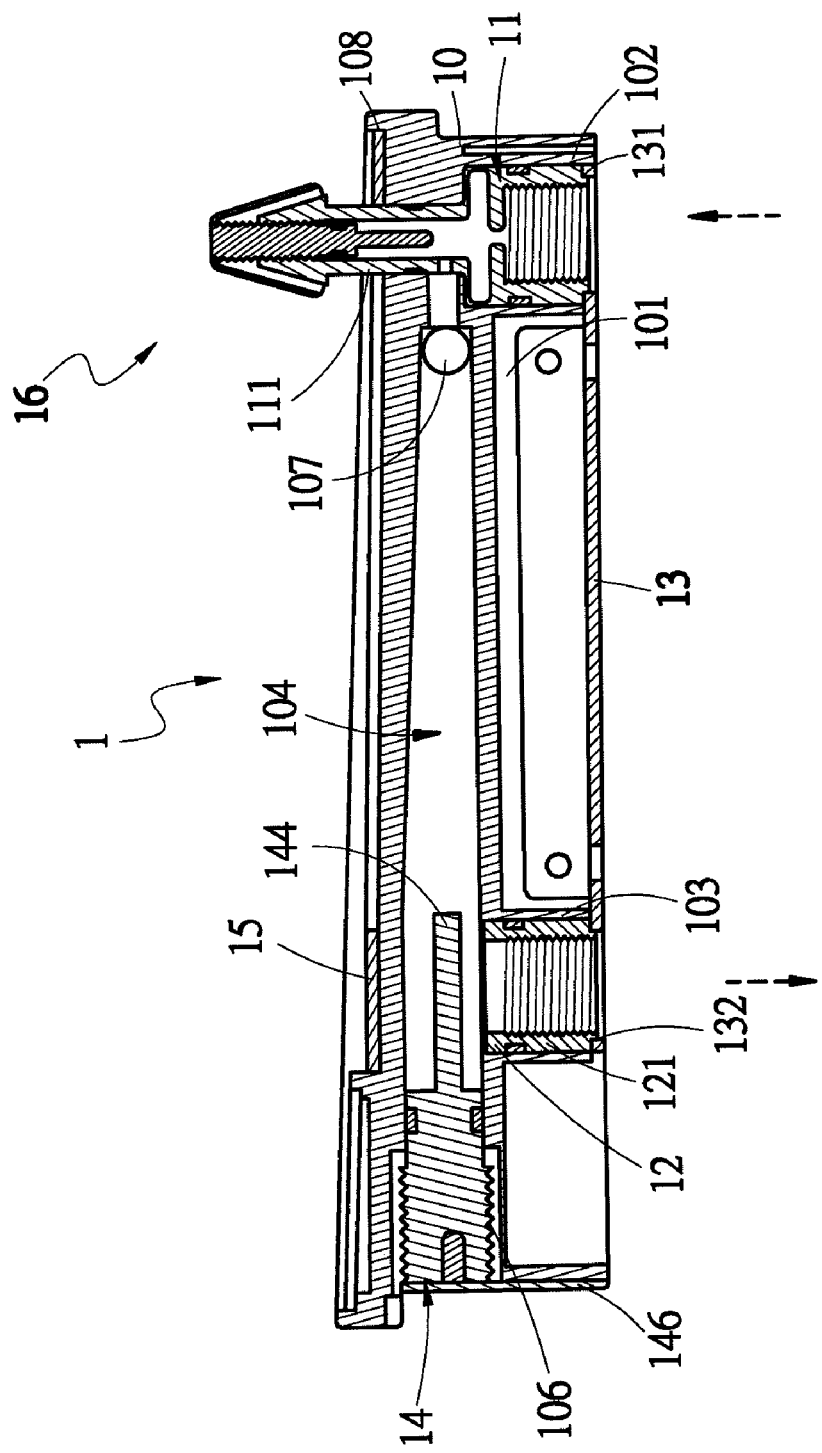
FIG. 3 is a schematic view according to FIG. 1.
Figure 4:
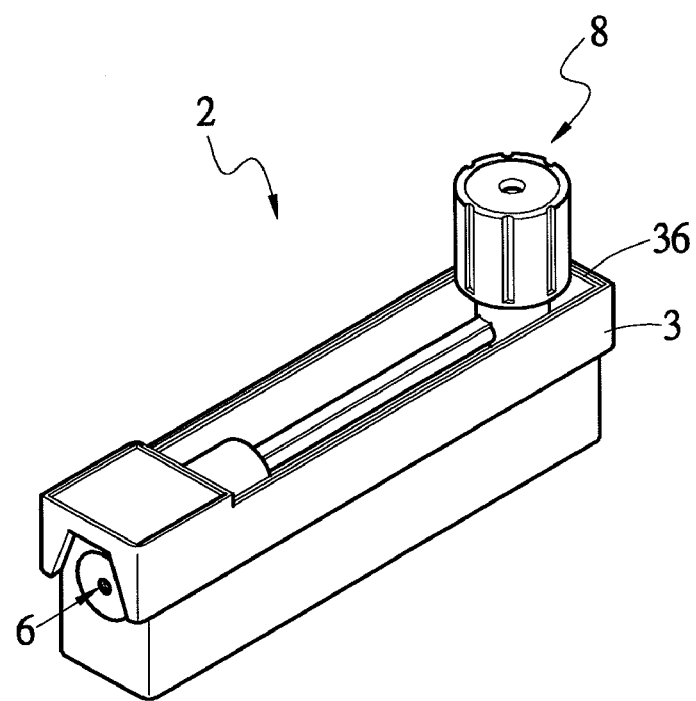
FIG. 4 is a perspective view of the flow meter of the invention.
Figure 5:
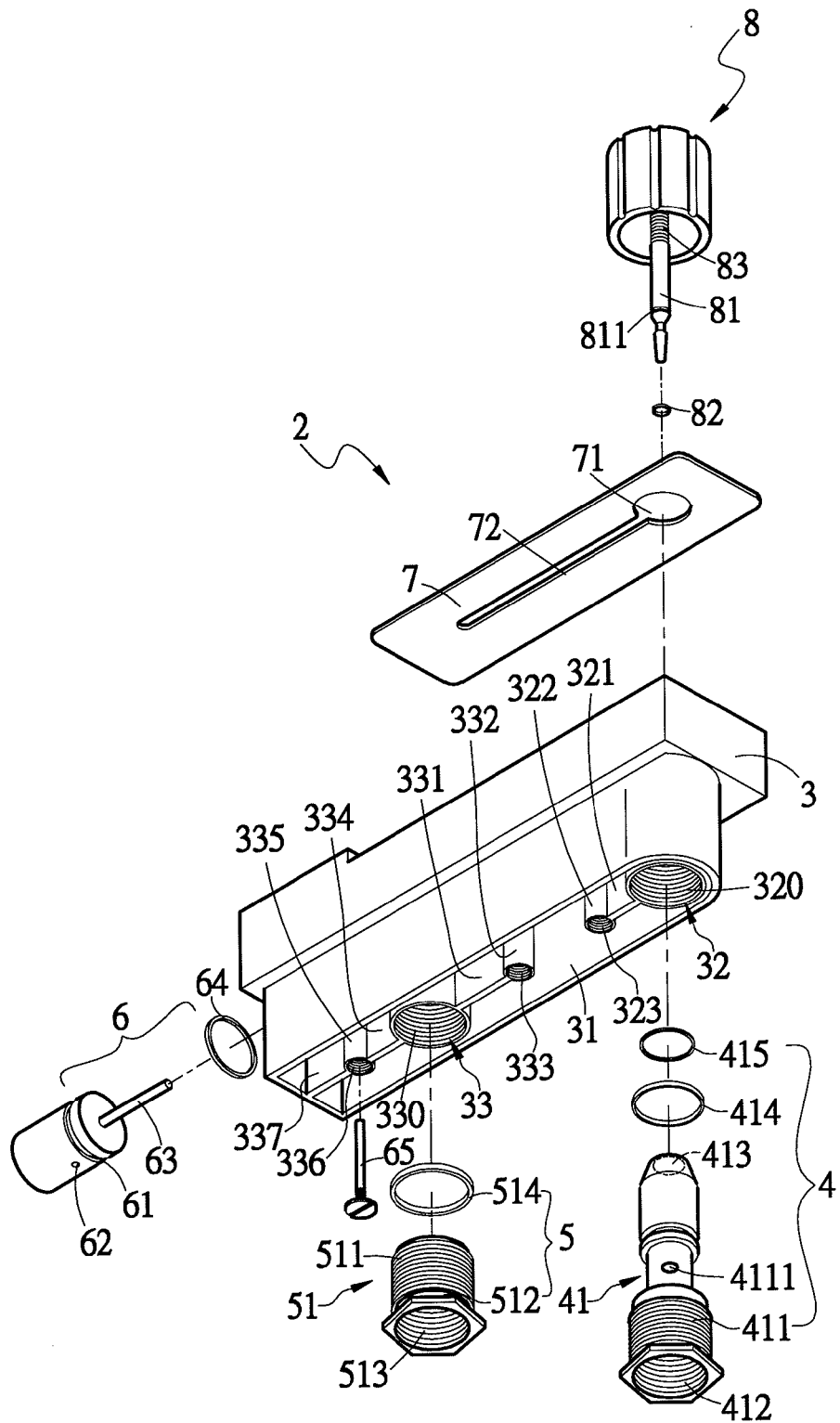
FIG. 5 is a bottom exploded view of the flow meter of the invention.

The present invention aims to provide an improved flow meter. Please refer to FIGS. 4 through 7, the flow meter 2 comprises:

a transparent holder 3 which has a housing chamber 31 at the lower side including an inlet 32 and an outlet 33 with respectively an internal screw hole 320 and 330 formed thereon, a flow passage 34 communicating with the inlet 32 and outlet 33, and also an aperture 35 at one end of the transparent holder 3 formed during a fabrication process and leading to the flow passage 34. The flow passage 34 holds an indication ball 351. The transparent holder 3 further has a recess 36 on an upper side to hold a flow scale plate 7. Incorporating the indication ball 351 with the flow scale plate 7, fluid flowing conditions can be seen by users. The transparent holder 3 also has a first fastening portion 322, a second fastening portion 332 and a third fastening portion 335 bridged to the inlet and the outlet through a first connection rib 321, a second connection rib 331, a third connection rib 334 and a fourth connection rib 337 on a lower end. Therefore, the first, second and third fastening portions 322, 332 and 335 and the inlet 32 and outlet 33 are coupled in an integrated fashion. The first, second and third fastening portions 322, 332 and 335 also have respectively a first, second and third fastening hole 323, 333 and 336 formed thereon. Through the first and second fastening holes 323 and 333, the transparent holder 3 can be firmly fastened on a machine (not shown in the drawings). The transparent holder 3 further has an opening 324 on an upper side communicating with the inlet 32;

a first fastening assembly 4 which includes a first fastening member 41 screwed into the inlet 32 and run through the opening 324. The first fastening member 41 has an upper end formed an external threaded portion 411 to screw with the internal screw hole 320 of the inlet 32. The first fastening member 41 also has a first internal screw hole 412 screwed with various types of fluid pipes (not shown in the drawings) at a lower end and a second internal screw hole 413 screwed with a regulation member 8 at an upper end, and a flow orifice 4111 at a middle section communicating with the flow passage 34. The first fastening assembly 4 has an upper end and a lower end coupled respectively with a first O-shaped ring 414 and a second O-shaped ring 415. Hence when the external threaded portion 411 of the first fastening assembly 41 is coupled with the inlet 32 of the transparent holder 3, they form a tight coupling between them through the first and second O-shaped rings 414 and 415;

a second fastening assembly 5 which includes a second fastening member 51 screwed into the outlet 33. The second fastening member 51 has an external threaded portion 511 screwed with the internal screw hole 330 of the outlet 33, an annular groove 512 at a lower side coupled with another O-shaped ring 514, and an internal screw hole 513 on a lower side screwed with various types of fluid pipes. (not shown in the drawings);

a butting member 6 which runs through one end of the flow passage 34 and is fastened thereon has an annular groove 61 to hold a leakage-proof sealing pad 64 to form tight coupling with the aperture 35, and also has a screw hole 62 on a lower side. When the butting member 6 is held in the aperture 35, a fastening element 65 is screwed into the third fastening hole 336 to be fastened in the screw hole 62. The butting member 6 also has a retaining bar 63 extended from one end into the flow passage 34 to retain the indication ball 351 from flowing out. The butting member 6 thus formed does not need a latch member 146 to latch the butting member 14 as the conventional flow meter 1 does, thus assembly of the invention is simpler and easier;

a flow scale plate 7 which is held in the recess 36 on the upper side of the transparent holder 3 has a hole 71 run through by a distal end of the first fastening member 41 and a slot 72 leading to the hole 71. The slot 72 has two sides marked by scales 73, thus fluid flowing amount can be instantly seen from outside of the transparent holder 3 based on the scales 73; and a regulation member 8 which includes a regulation stem 81 with an annular groove 811 close to a distal end thereof to be coupled with a pliable pad 82 and an external threaded portion 83 close to an upper side to screw with the second internal screw hole 413 at the lower end of the first fastening member 41 held in the opening 324 of the inlet 32. The regulation member 8 can be rotated to control the regulation bar 81 at the position where the first fastening member 41 is to adjust the fluid flowing amount within a high and low range.

Figure 7:
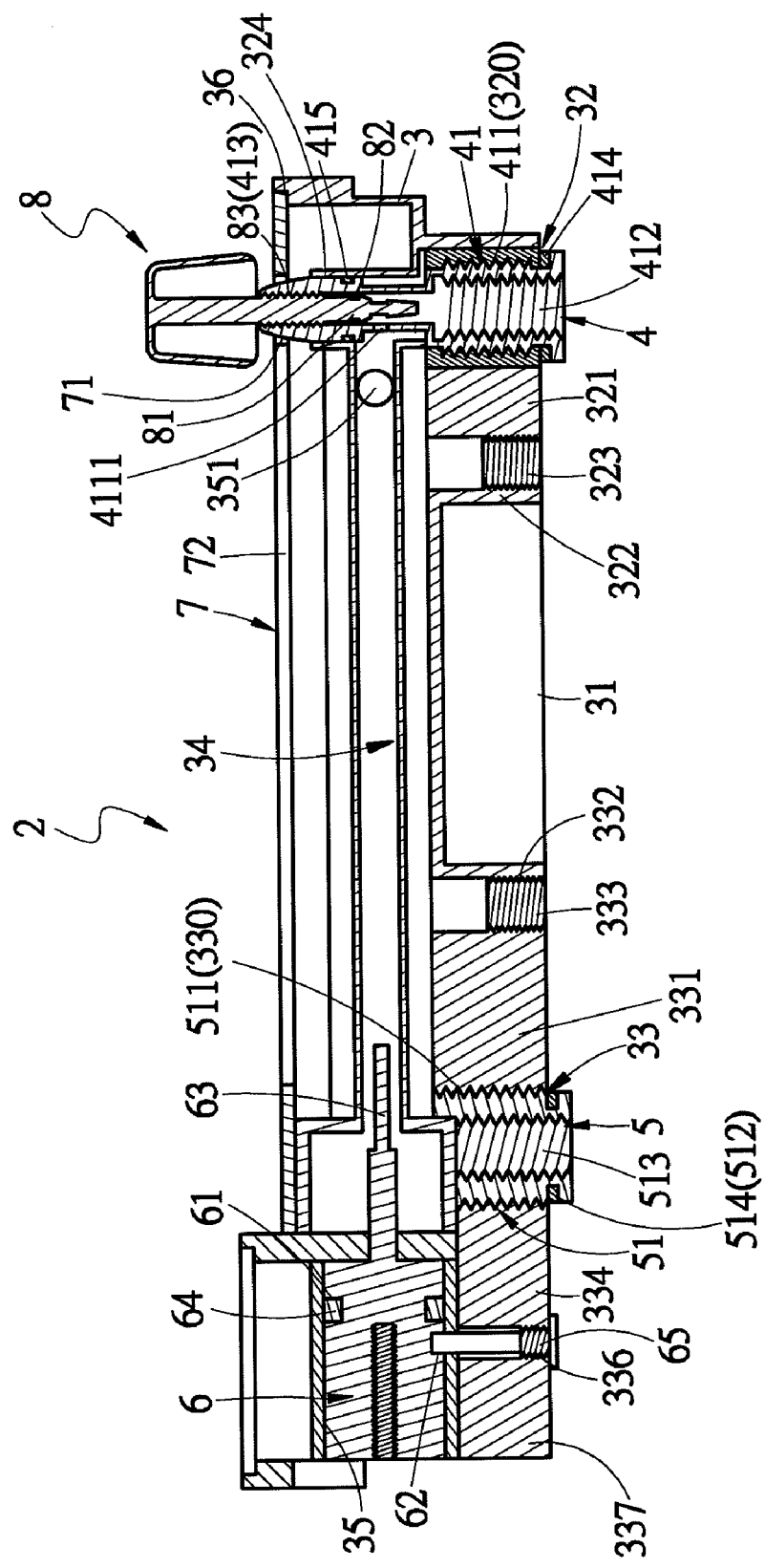
FIG. 7 is a sectional view of the flow meter of the invention.

Referring to FIG. 7, as the flow meter 2 is assembled, the inlet 32 and outlet 33 of the transparent holder 3 are coupled with the first and second fastening portions 322 and 332 to form a integral to allow the transparent holder 3 to be firmly fastened on the machine, and the external threaded portions 411 and 511 of the first and second fastening assemblies 4 and 5 are screwed respectively with the inlet 32 and outlet 33, thus the first internal screw hole 412 and internal screw hole 513 of the first and second fastening members 41 and 51 are screwed with various types of fluid pipes to form secured fastening. As a result, the inlet 32 and outlet 33 can be positioned firmly without loosening by screw fastening of the first and second fastening portions 322 and 332 even the inlet and the outlet has been impacted by the hydraulic pressure. Thus the structural strength of the transparent holder 3 increases.

Figure 6:
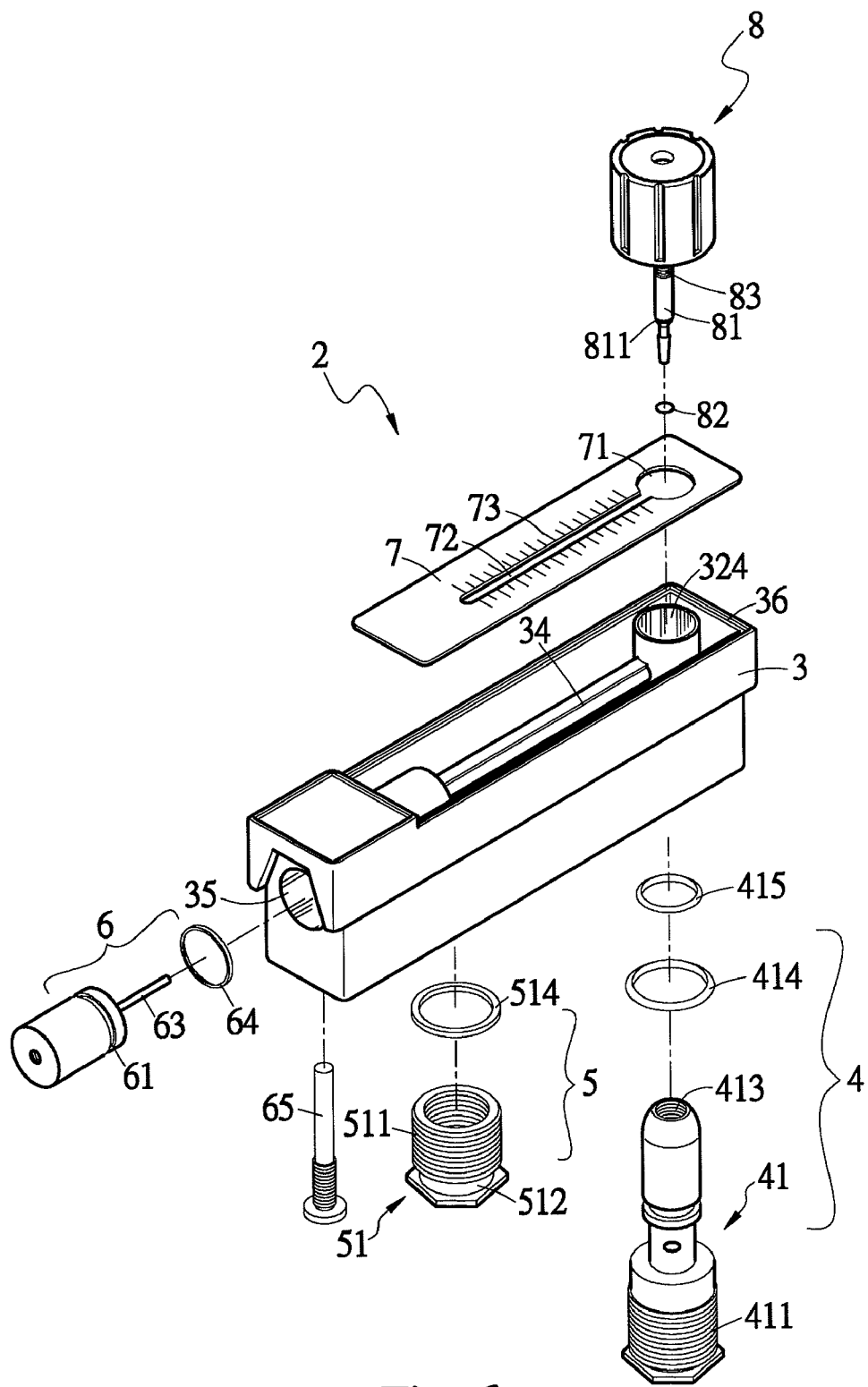
FIG. 6 is a front exploded view of the flow meter of the invention.
Figure 8:
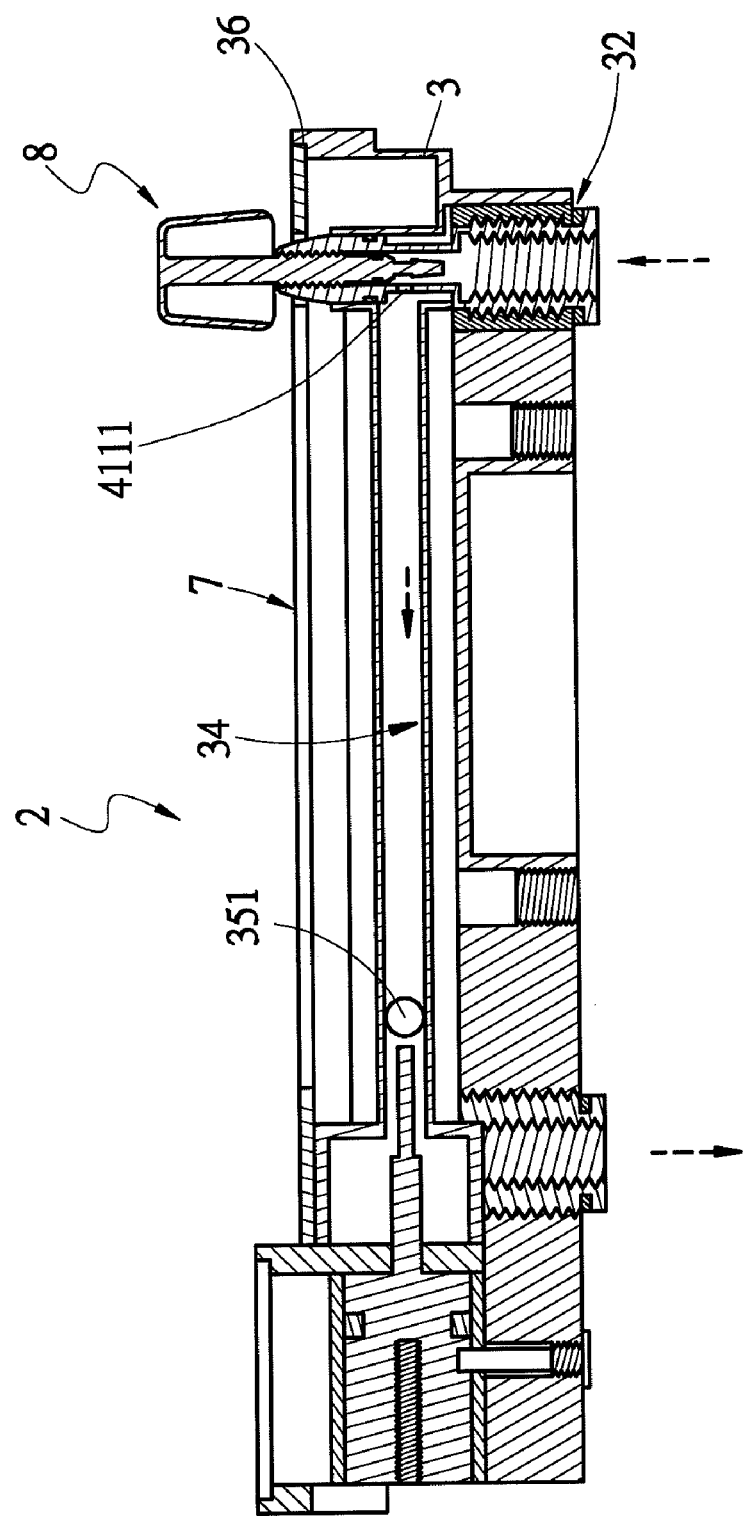
FIG. 8 is a schematic view of the flow meter of the invention in a using condition.

When in use, referring to FIGS. 6 and 8, the flow meter 2 is installed on the fluid piping of a machine. Fluid (shown by broken lines in FIG. 8) flows in through the inlet 32. The regulation member 8 can control and adjust the fluid flowing amount within the high and low range so that the fluid flows through the flow orifice 4111 to the flow passage 34, then moves the indication ball 351 in the flow passage 34 by push of the hydraulic pressure. Incorporating with scales 73 of the flow scale plate 73 held in the recess 36 on the upper side of the transparent holder 3, fluid flowing amount can be instantly seen and read from outside of the sturdier flow meter 2 by the user.

What is claimed is:

1. A flow meter, comprising:
a transparent holder which includes a housing chamber at a lower side, an inlet and an outlet in the housing chamber, and a flow passage communicating with the inlet and the outlet, the housing chamber also including a first fastening portion, a second fastening portion and a third fastening portion bridged respectively by a first connection rib, a second connection rib, a third connection rib and a fourth connection rib, the transparent holder also including an opening on an upper side communicating with the inlet;
a first fastening assembly and a second fastening assembly that include respectively a first fastening member and a second fastening member screwed with the inlet and the outlet to communicate with the flow passage;
a butting member running through one end of the flow passage and engaged therewith;
a flow scale plate located on the upper side of the transparent holder; and
a regulation member coupled with the first fastening member held in the opening above the inlet.

2. The flow meter of claim 1, wherein the first, second, third and fourth connection ribs are integrally formed.

3. The flow meter of claim 2, wherein the first, second and third fastening portions include respectively a first fastening hole, a second fastening hole and a third fastening hole, the first and second fastening holes allowing the transparent holder to be firmly positioned, while the third fastening hole being screwed with a fastening element.

4. The flow meter of claim 3, wherein the butting member includes an annular groove to couple with a leakage-proof sealing pad, a screw hole on a lower side fastened by the fastening element screwed with the third fastening hole, and a retaining bar extended from one end into the flow passage.

5. The flow meter of claim 1, wherein the first fastening member includes an external threaded portion on an upper side to screw with the inlet, a first internal screw hole on the upper side and a second internal screw hole on a lower side screwed with the regulation member, and a flow orifice on a middle section leading to the flow passage.

6. The flow meter of claim 1, wherein the second fastening member includes an external threaded portion screwed with the outlet and an internal screw hole on a lower side.

* * * * *